United States Patent
Chandan et al.

(10) Patent No.: US 10,222,774 B2
(45) Date of Patent: Mar. 5, 2019

(54) PREVENTING UNAUTHORIZED MOVEMENT OF ENERGY ACROSS GRID NETWORKS DUE TO PORTABLE STORAGE DEVICES

(71) Applicant: International Business Machines Corporation, Armonk, NY (US)

(72) Inventors: Vikas Chandan, Bangalore (IN); Pankaj Dayama, Bangalore (IN); Krishnasuri Narayanam, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 92 days.

(21) Appl. No.: 15/603,918

(22) Filed: May 24, 2017

(65) Prior Publication Data

US 2018/0341239 A1    Nov. 29, 2018

(51) Int. Cl.
G05B 19/042    (2006.01)
G05D 23/19    (2006.01)
H01M 10/44    (2006.01)

(52) U.S. Cl.
CPC .... *G05B 19/042* (2013.01); *G05B 2219/2639* (2013.01); *G05D 23/19* (2013.01); *H01M 10/44* (2013.01)

(58) Field of Classification Search
CPC .... G05D 23/19; H01M 10/44; H01M 10/441; H01M 2010/4271
See application file for complete search history.

(56) References Cited

U.S. PATENT DOCUMENTS

| | | |
|---|---|---|
| 5,701,068 A | 12/1997 | Baer et al. |
| 7,191,077 B2 | 3/2007 | Mese et al. |
| 2008/0218126 A1 | 9/2008 | Bansal et al. |
| 2010/0315197 A1* | 12/2010 | Solomon .............. G06F 21/31 340/5.2 |
| 2011/0084665 A1 | 4/2011 | White et al. |
| 2013/0179061 A1 | 7/2013 | Gadh et al. |
| 2013/0346762 A1* | 12/2013 | Hodges ............ H01M 10/4257 713/300 |
| 2015/0357848 A1 | 12/2015 | Chandan et al. |
| 2016/0197478 A1 | 7/2016 | Khaitan et al. |

* cited by examiner

*Primary Examiner* — Michael J Brown
(74) *Attorney, Agent, or Firm* — Ryan, Mason & Lewis, LLP (57) ABSTRACT

Methods, systems, and computer program products for preventing unauthorized movement of energy across grid networks due to portable storage devices are provided herein. A computer-implemented method includes dividing a portable energy storage device into multiple virtual energy storage sub-units, restricting each of one or more energy charging options to one or more distinct charging modes, restricting each of one or more energy discharging options to one or more distinct discharging modes, mapping, in accordance with one or more pre-defined rules, each respective one of the multiple virtual energy sub-units to at least one of one or more of the distinct charging modes and one or more of the distinct discharging modes, and automatically charging and automatically discharging the portable energy storage device based on the mapping and one or more contextual details.

20 Claims, 8 Drawing Sheets

FIG. 1

MODE "SD" (Self Discharging)

MODE "HD" (Home Discharging, e.g. Grid Feed In)

PREVENTING UNAUTHORIZED MOVEMENT OF ENERGY ACROSS GRID NETWORKS DUE TO PORTABLE STORAGE DEVICES

FIELD

The present application generally relates to information technology, and, more particularly, to energy management techniques.

BACKGROUND

Unauthorized movement of energy constitutes an increasingly common challenge for enterprises and utilities. By way of example, consider a scenario wherein a user charges his or her car battery in an office parking lot (using the free charging facility provided by the office). Here, the car battery is used for storing energy. Subsequently, the user drives the car home in the evening, and the user then connects the car battery to the user's home network, using a feed-in tariff. Here, the car battery is used as a power source to a smart grid network. Additionally, it is possible that the user's home network and the user's office network are on different grids. In such a scenario, there may be an unauthorized movement of power from one network (the office network) into another network (the home network).

SUMMARY

In one embodiment of the present invention, techniques for preventing unauthorized movement of energy across grid networks due to portable storage devices are provided. An exemplary computer-implemented method can include dividing a portable energy storage device into multiple virtual energy storage sub-units, restricting each of one or more energy charging options to one or more distinct charging modes, restricting each of one or more energy discharging options to one or more distinct discharging modes, mapping, in accordance with one or more pre-defined rules, each respective one of the multiple virtual energy sub-units to at least one of one or more of the distinct charging modes and one or more of the distinct discharging modes, and automatically charging and automatically discharging the portable energy storage device based on the mapping and one or more contextual details.

In another embodiment of the invention, an exemplary computer-implemented method can include compartmentalizing energy stored in a portable energy storage device into multiple virtual energy storage sub-units, wherein the portable energy storage device is associated with a user, as well as mapping, based on one or more preferences defined by the user, each respective one of the multiple virtual energy sub-units to at least one of one or more distinct charging modes and one or more distinct discharging modes. Such a method can also include charging and discharging the portable energy storage device based on the mapping and one or more contextual details, and precluding charging and discharging of the portable energy storage device under conditions that are in conflict with the mapping and the one or more contextual details.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes preventing unauthorized movement of energy across grid networks due to portable storage devices. At least one embodiment of the invention can include dividing energy stored in a portable storage device (such as a battery, for example) into multiple virtual bins or units, and tracking the charging and/or discharging of the individual bins/units. Additionally, one or more embodiments of the invention can include mapping virtual bins/units of a portable storage device to charging modes and/or discharging modes, and defining rules for selecting bins/units for various charging/discharging modes.

As also detailed herein, charging and discharging options can be compartmentalized into modes. For example, for an electric vehicle battery, there can exist an office charging mode (meaning that the battery is charged at an office premises), a home charging mode (meaning that the battery is charged at a home location), a self-discharge mode (meaning that the battery is discharged while vehicle is being driven or otherwise operated), a grid feed-in mode (meaning that the battery is discharged by providing energy to the grid), etc. It should also be noted that there can be multiple additional modes both for charging and discharging of a battery.

Accordingly, as further detailed herein, one or more embodiments of the invention can include utilizing one physical battery for multiple purposes by managing the one physical battery as a set of multiple virtual batteries. In such an embodiment, charging and discharging options for the battery can be compartmentalized into modes, and energy stored in the battery can be compartmentalized into bins. As such, energy bins can be mapped to allowed and/or feasible charging and discharging modes. Further, in at least one embodiment of the invention, the user (of the battery) can configure the charging and discharging modes, the energy bins, and/or the mapping between them. Additionally, at least one embodiment of the invention can include selecting appropriate input energy bins to meet user demand in order to minimize overall energy costs and to ensure that all user-defined rules are satisfied.

By way of example, for a given type of user demand (which may be represented by the type of discharge mode), if energy can be potentially drawn from any one of multiple bins, as per the defined mapping, a user-generated rule may specify the basis upon which one can select one of the bins. For instance, for a self-discharge mode demand, the rule can require when bins filled by an "office charge" mode should be used first, followed by bins filled by "home charge" mode.

Also, one or more embodiments of the invention can include tracking and managing energy flow into and out of virtual battery bins with respect to compatible charging and discharging modes. As noted above, charging and discharging options for a battery can be compartmentalized into modes. For example, an electric vehicle (EV) battery can have an office charging mode, a home charging mode, a self-discharging mode, a grid feed-in mode, etc. As also noted herein, the energy stored in the battery can be compartmentalized into bins. By way of example, a default configuration might include one bin representing existing battery capacity.

Energy bins are then mapped to allowed and/or feasible charging and discharging modes, wherein the user can be provided the option to dynamically choose the default bin for different modes. Additionally, one or more embodiments of the invention can include dynamically determining and recommending (to the user) the most suitable/appropriate mapping between modes and bins via consideration of supply and demand constraints. Also, at least one embodiment of the invention can include generating and/or providing a user interface for the user to view and/or access the current state of the capacities in different bins.

Figure 1:
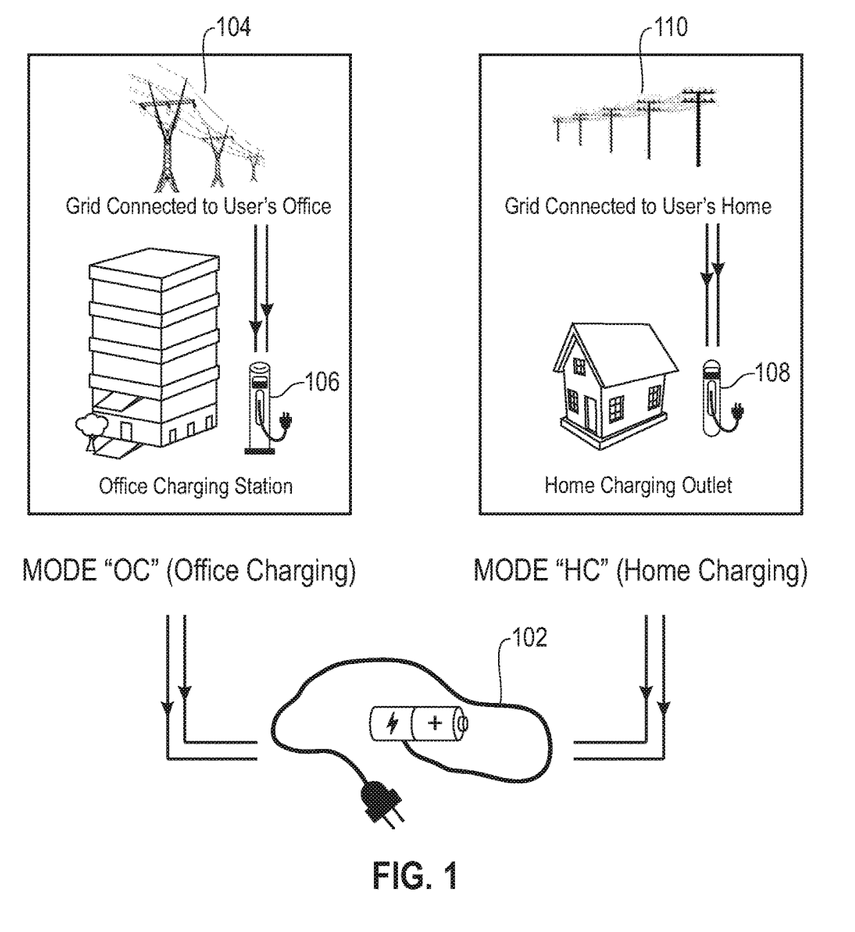
FIG. 1 is a diagram illustrating system architecture, according to an exemplary embodiment of the invention.

FIG. 1 is a diagram illustrating system architecture, according to an embodiment of the invention. By way of illustration, FIG. 1 depicts charging options for a battery 102 compartmentalized into modes. For example, an office charging (OC) mode includes the battery 102 connecting to an office charging station 106, which is linked to a grid 104 connected to the user's office. Additionally, a home charging (HC) mode includes the battery 102 connecting to a home charging outlet 108, which is linked to a grid 110 connected to the user's home.

Figure 2:
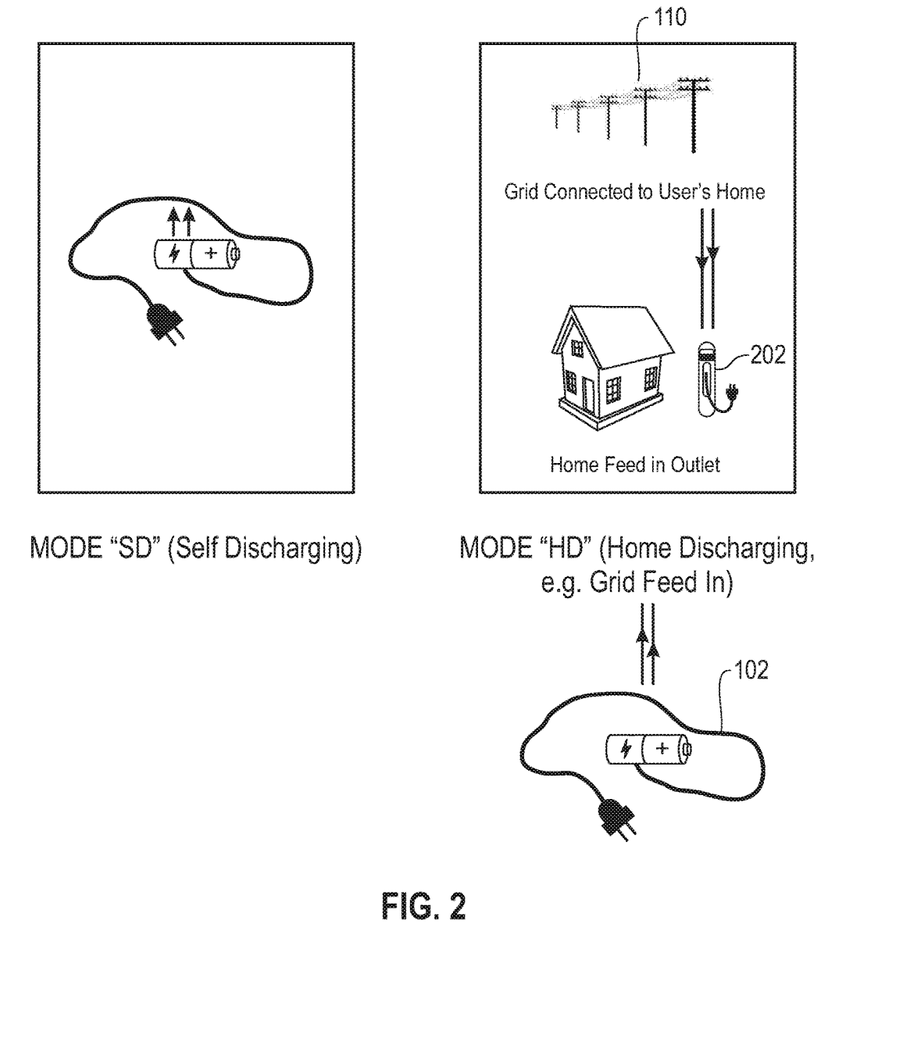
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts discharging options for battery 102 compartmentalized into modes. In addition to a self-discharging (SD) mode, FIG. 2 depicts a home discharging (HD) mode (also referred to herein as a grid feed-in), which includes the battery 102 connecting to a home feed-in outlet 202, which is linked to grid 110 connected to the user's home.

Figure 3:
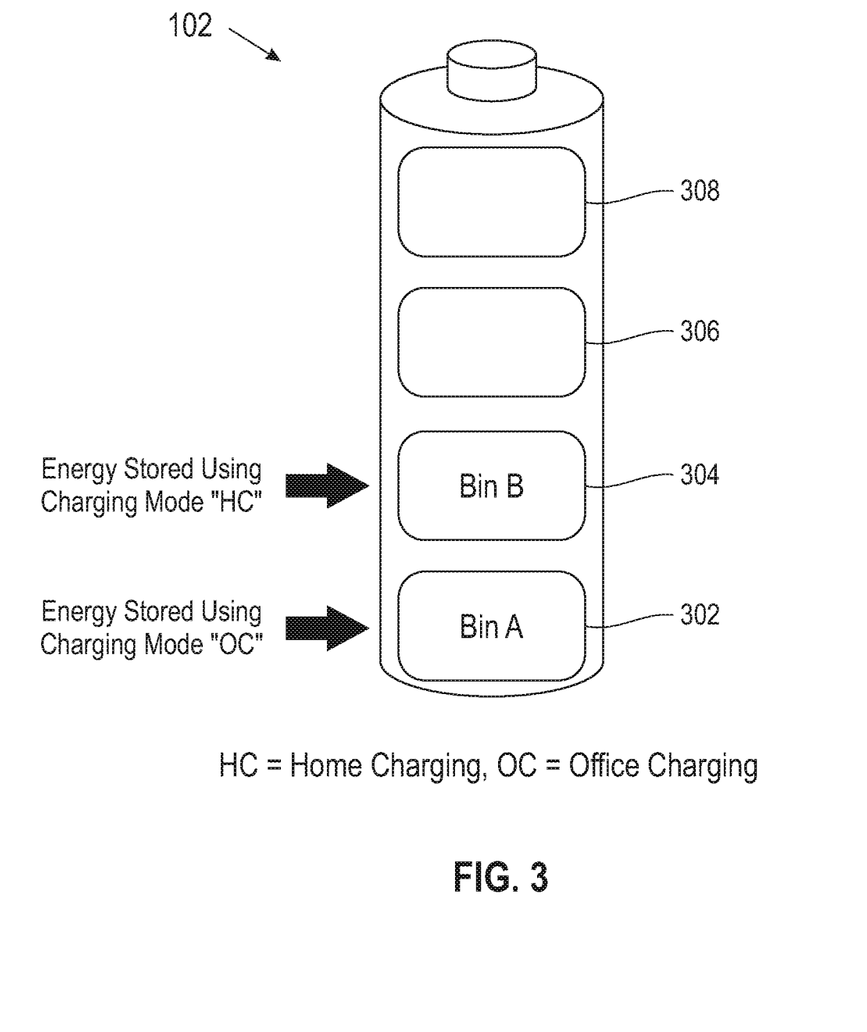
FIG. 3 is a diagram illustrating compartmentalized energy storage in a battery, according to an exemplary embodiment of the invention.

FIG. 3 is a diagram illustrating compartmentalized energy storage in battery 102, according to an exemplary embodiment of the invention. By way of illustration, FIG. 3 depicts energy stored in battery 102 compartmentalized into (virtual) bins 302, 304, 306, and 308, based on charging mode. Specifically, in the FIG. 3 example, energy is stored in bin 302 using an office charging mode, and energy is stored in bin 304 using a home charging mode.

Figure 4:
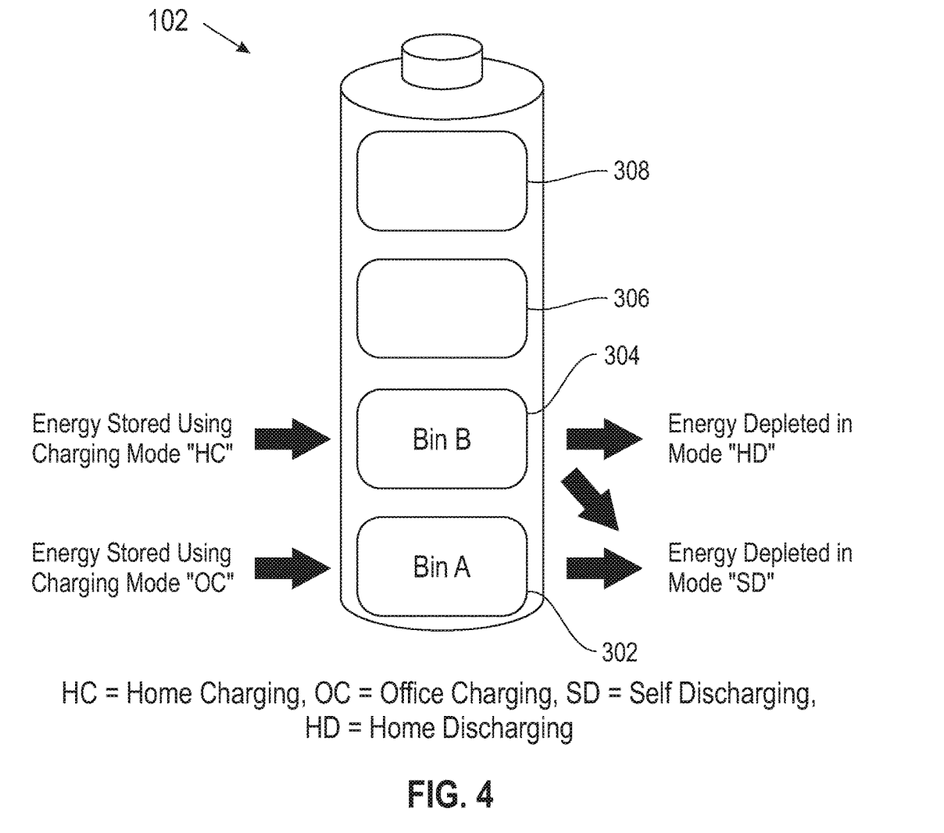
FIG. 4 is a diagram illustrating mapped energy bins within a battery, according to an exemplary embodiment of the invention.

FIG. 4 is a diagram illustrating mapped energy bins within battery 102, according to an exemplary embodiment of the invention. By way of illustration, FIG. 4 depicts energy bins 302, 304, 306, and 308 mapped to allowed/feasible discharging modes of battery 102. Specifically, FIG. 4 depicts a mapping wherein energy in bin 302 is depleted in a self-discharging mode, as well as a mapping wherein energy in bin 304 is depleted in a home discharging mode as well as a self-discharging mode. In other words, energy in bin 302 can be used whenever there is demand for a self-discharging mode, whereas energy in bin 304 can be used both for home discharging and for a self-discharging mode. Further, in such an example embodiment, if there is demand for a self-discharging mode, the bin that will actually provide energy would depend on user-specified rules and/or default rules. As per one or more rules, one of the bins can be initially selected, both bins can be depleted in a certain proportion, etc.

As detailed herein, default bins can be chosen for each mode, and such bin selection can be made dynamically and/or manually (by the user). By way of example, refer again to FIG. 4. For discharging mode SD, there are two selected bins, wherein bin 302 can be selected as the default bin, with an option to switch to bin 304 in real-time.

Additionally, given the future demand and supply profile for a user, at least one embodiment of the invention can include dynamically recommending the most appropriate mapping between modes and bins, under one or more constraints. In one or more embodiments of the invention, a future supply profile can be based on user schedules. For example, if a user is going to be in the office from 9:00 AM through 5:00 PM over the next two days, then that user may have access to an office charging mode during this time. Similarly, if a user is planning to visit place "X," which is 100 miles away, at 10:00 AM tomorrow, then the user will be requiring energy for a self-discharge mode both before and after that visit (for the outgoing and return transit). In at least one embodiment of the invention, such types of demand and supply profiles can also be determined from historical data.

Constraints, as noted above, can include, for example, maintaining a certain minimum level of charging for all bins. For optimal mapping between bins and discharging modes, one or more embodiments of the invention can include implementing one or more optimization formulations.

In an example formulation, let $(I_1, I_2, \ldots, I_m)$ represent the m possible bins, and let $(O_1, O_2, \ldots, O_n)$ represent the n possible discharging modes. Accordingly, $M_{ij}=1$ if mode j is a feasible discharging mode for energy stored in bin i. As used above and herein, "m" indicates how many bins (compartments) can be generated/created for a given battery. Similarly, "n" captures the number of discharge modes. Also, as used above and herein, "M" represents a matrix that captures whether energy from a given bin can be used for a discharge mode (that is, "M" captures the mapping from bins to discharge modes).

Also, in such an example formulation, $P_j$ can represent preference rules for the selection of bins for discharge mode j, and $S(t)=(S_1(t), S_2(t), \ldots, S_m(t))$ can represent the available supply for different storage bins at time t, and the corresponding cost $C(t)=(C_1(t), C_2(t), \ldots, C_m(t))$. Additionally, $D(t)=(D_1(t), D_2(t), \ldots, D_n(t))$ can represent the forecasted demand at time t for different discharge modes, and $T=(T_1, T_2, \ldots, T_m)$ can represent the minimum charge to be maintained in each of the storage bins. Further, $X_{ij}(t)$ can represent an indicator variable if bin i is used to meet the demand of mode j at time t, and $Y_i(t)$ can represent an indicator variable if bin i is charged at time t.

Additionally, in one or more embodiments of the invention, a similar formulation (as detailed above) can be developed for optimal mapping between bins and charging modes. For charging modes, such an embodiment can include selecting an optimal mapping between one or more charging modes and one or more bins. Mapping formulations for both charging and discharging can be implemented for deciding, in real time, whenever there is available supply, how energy should flow from a given charging mode into one or more particular bins, and whenever there is demand, how energy should flow from one or more bins to a given discharging mode.

At least one embodiment of the invention can include minimizing charging costs as well as any penalty due to unmet demand, subject to constraints such as a system feasibility constraint, a user preference constraint, a bin charging constraint, and/or a demand satisfaction constraint. A system feasibility constraint can require that variables satisfy constraints imposed by a matrix M. As noted herein, matrix M, an input to the system, is a mapping matrix which indicates which charging modes can charge which bins, and which bins can provide energy to which discharging modes. A user preference constraint can require satisfying user preference constraints for fulfilling demand time. A bin charging constraint can require that a bin can be charged only when the bin has access to a corresponding supply. Also, a demand satisfaction constraint can require that demand at time t should be met by one or more storage bins, and any unmet demand is penalized.

By way merely of illustration, consider the following example scenario, wherein a company provides an EV battery charging facility in an office campus parking lot. Also, assume that the company does not want its employees to use battery power derived from (that is, charged-in from) the office for unauthorized purposes (for example, subsequently connecting to a home grid using a feed-in tariff). Assume also that an employee (of the company) can charge (and use) the same EV battery outside of the office premises. Accordingly, battery power capacity charged at the office parking lot and battery power capacity charged outside of the office premises are to be tracked separately.

In connection with such an example scenario, assume that an embodiment of the invention is implemented whereby there are two virtual bins created and/or organized inside of a given EV battery. Assume that each of the office parking lot sockets includes a radio-frequency identification (RFID) mechanism and/or a barcode, indicating that the socket is a part of the office network, and that the EV battery provided by the office includes a plug with an RFID and/or barcode sensor for scanning. It should be appreciated that an RFID and/or barcode sensor represents merely one example implementation, and that one or more embodiments of the invention can include one or more additional/alternate implementations (such as using global positioning system (GPS) location, etc.).

As such, when an employee's EV battery is plugged into a socket in the office parking lot, the power can be charged and stored into a virtual partition bin on the EV battery that is designated for the office. This office-bin can additionally, for example, allow only the first two of the following possible discharge modes:

(1) Self-discharge mode (identified, for example, via GPS reporting movement);
(2) Authorized non-driving discharge mode (identified, for example, via lack of GPS movement reporting and RFID/barcode activation); and
(3) Any other non-driving discharge mode (identified, for example, via lack of GPS movement reporting and RFID/barcode rejection).

An authorized non-driving discharge mode can include an EV battery being plugged-in to a socket having a company RFID/barcode. If the sensor on the EV battery plug identifies that there is no office RFID/barcode detected on the socket, only a general-bin (that is, not the designated office-bin) could be used for the in/out power transfer. The charging mode allowed for the office-bin could include an office charging mode (which can be RFID/barcode-activated). Any other charging mode would use a general-bin.

Accordingly, such an embodiment of the invention can include mapping the office-bin to an office charging mode, a self-discharge mode, as well as an authorized non-driving discharge mode. Further, such an embodiment can include mapping a general-bin to any other charging mode (that is, not an office charging mode) and any other non-driving discharge mode. Such a general bin may be mapped, for example, to a home charging mode, or a separate office charging mode which does not want to track the usage of the power by employees, etc. In at least one or more embodiments of the invention, many such office bins can be created and/or organized within a battery (for example, one bin corresponding to each office associated with the user of the battery) if multiple offices want to track their respective employee's power usage using a single battery (in situations wherein one person—the user of the battery—is employed by multiple employers, etc.).

At least one embodiment of the invention can also include advanced tracking of charging and discharging modes. Some types of batteries (such as, for example, laptop batteries) can provide application programming interfaces (APIs) to track the power charging and discharging rates (through the use of device control commands). Accordingly, one or more embodiments of the invention can include building a profile of battery power charge/discharge rates, and identifying which charging/discharging mode the battery is operating under (assuming that the charge/discharge rates are different). With EV batteries, for example, a GPS location can be used to track the charging/discharge modes. In such an embodiment, if the charge/discharge rates are the same at two different points in time, but the GPS location information is different, then the readings may correspond to two different modes of use. The discharge mode can also be identified, for example, by communicating with a smart meter to which the battery is connected.

Figure 5:
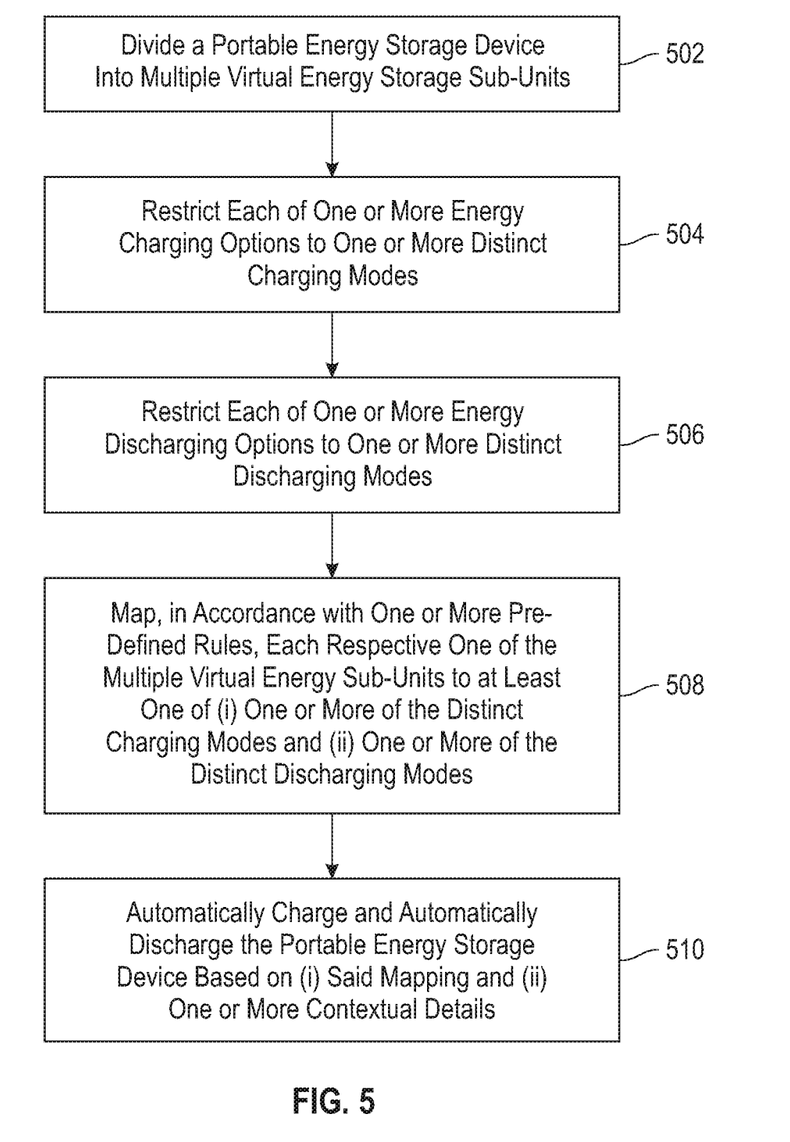
FIG. 5 is a flow diagram illustrating techniques according to an embodiment of the invention.

FIG. 5 is a flow diagram illustrating techniques according to an embodiment of the present invention. Step 502 includes dividing a portable energy storage device into multiple virtual energy storage sub-units (also referred to herein as "bins" or "units"). The portable energy storage device comprises a battery (such as an EV battery, a laptop battery, etc.). Additionally, each of the virtual energy storage sub-units can represent a portion of energy storage capacity of the portable energy storage device.

Step 504 includes restricting each of one or more energy charging options to one or more distinct charging modes. The one or more distinct charging modes can include an office charging mode and/or a home charging mode. Step 506 includes restricting each of one or more energy discharging options to one or more distinct discharging modes.

The one or more distinct discharging modes can include a self-discharging mode and/or a grid feed-in mode.

Step 508 includes mapping, in accordance with one or more pre-defined rules, each respective one of the multiple virtual energy sub-units to at least one of (i) one or more of the distinct charging modes and (ii) one or more of the distinct discharging modes. The one or more pre-defined rules can include one or more rules pertaining to mapping feasibility. Additionally, the one or more pre-defined rules can include one or more user-defined rules. The user-defined rules can include one or more user-defined rules for selecting one or more of the multiple virtual energy sub-units for a particular one of the distinct charging modes if multiple options are permissible per said mapping. Additionally, the user-defined rules can include one or more user-defined rules for selecting one or more of the multiple virtual energy sub-units for a particular one of the distinct discharging modes if multiple options are permissible per said mapping.

Step 510 includes automatically charging and automatically discharging the portable energy storage device based on (i) said mapping and (ii) one or more contextual details. The one or more contextual details can include one or more energy demand parameters associated with the portable energy storage device, one or more energy supply parameters, and/or one or more cost parameters.

The techniques depicted in FIG. 5 can also include tracking energy flow into and out of each of the virtual energy storage sub-units with respect to the one or more distinct charging modes and the one or more distinct discharging modes. Additionally, at least one embodiment of the invention can include generating a user interface, wherein the user interface enables user access to a current state of one or more of the multiple virtual energy sub-units, user-reconfiguration of said mapping, and/or user-definition of one or more user preferences.

Also, an additional embodiment of the invention includes compartmentalizing energy stored in a portable energy storage device into multiple virtual energy storage sub-units, wherein the portable energy storage device is associated with a user, as well as mapping, based on one or more preferences defined by the user, each respective one of the multiple virtual energy sub-units to at least one of one or more distinct charging modes and one or more distinct discharging modes. Such an embodiment can also include charging and discharging the portable energy storage device based on the mapping and one or more contextual details, and precluding charging and discharging of the portable energy storage device under conditions that are in conflict with the mapping and the one or more contextual details.

Also, such an embodiment can include generating a user interface, wherein the user interface enables the user to monitor a current state of storage capacity in the virtual energy storage sub-units, re-define one or more of the preferences, and reconfigure one or more mappings between the multiple virtual energy sub-units, the one or more of the distinct charging modes, and the one or more of the distinct discharging modes.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
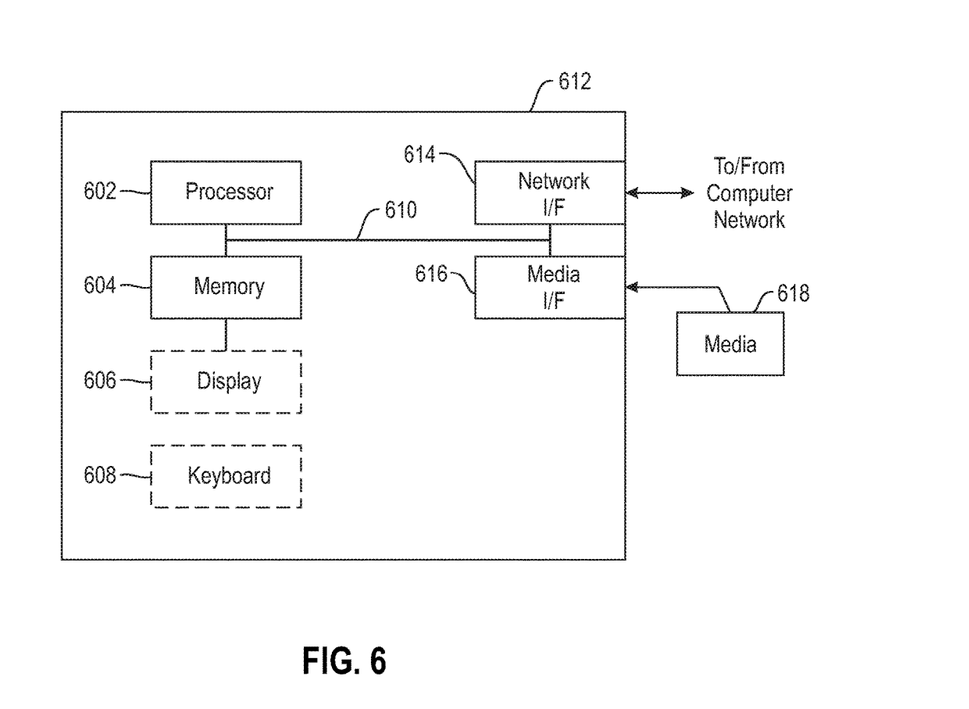
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
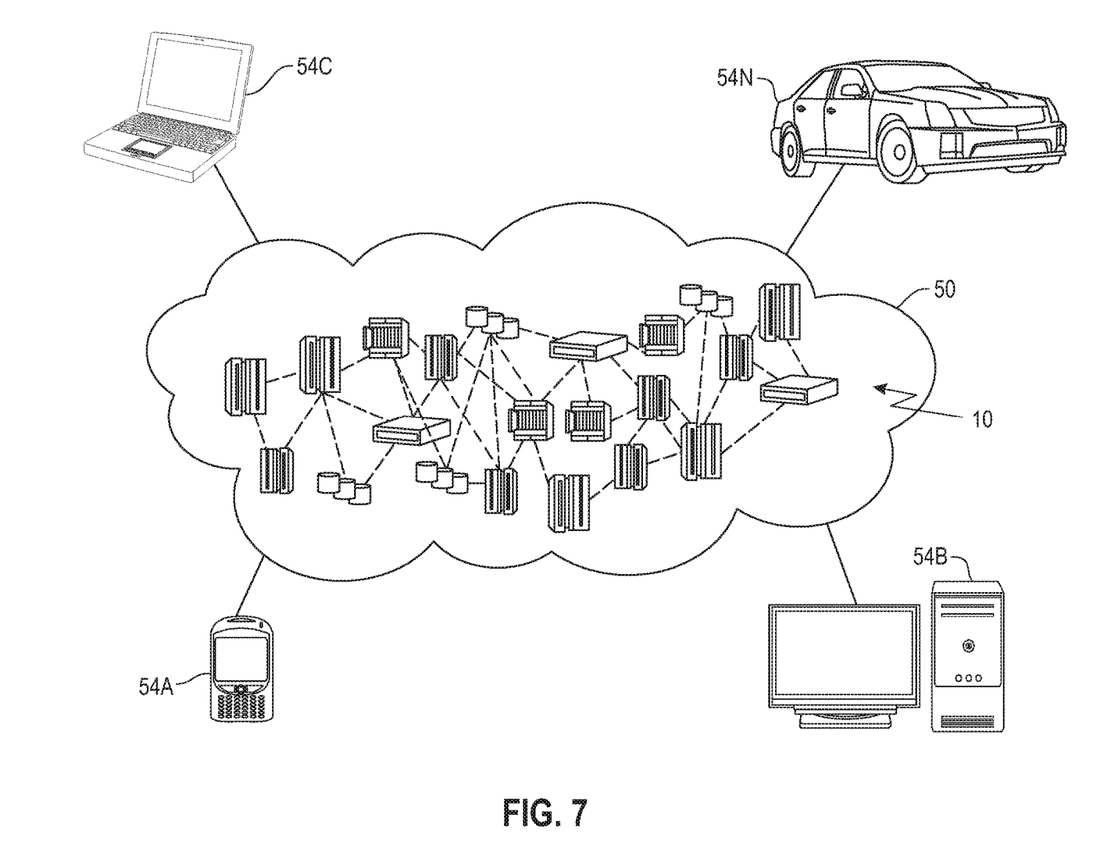
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
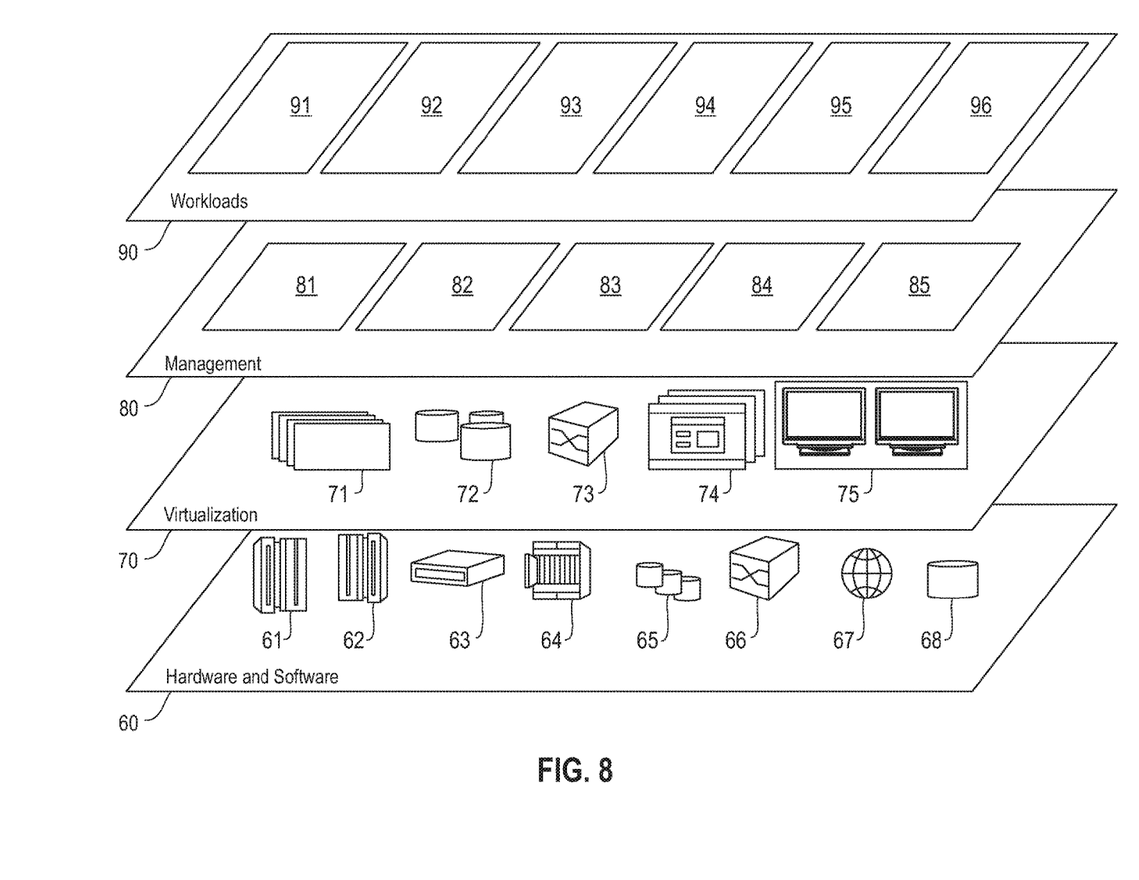
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual battery compartmentalization and management 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, mapping virtual units of a battery to charging/discharging modes and defining rules for selecting units for various charging/discharging modes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
    dividing a portable energy storage device into multiple virtual energy storage sub-units;
    restricting each of one or more energy charging options to one or more distinct charging modes;
    restricting each of one or more energy discharging options to one or more distinct discharging modes;
    mapping, in accordance with one or more pre-defined rules, each respective one of the multiple virtual energy sub-units to at least one of (i) one or more of the distinct charging modes and (ii) one or more of the distinct discharging modes; and
    automatically charging and automatically discharging the portable energy storage device based on (i) said mapping and (ii) one or more contextual details;
    wherein the steps are carried out by at least one computing device.

2. The computer-implemented method of claim 1, wherein the portable energy storage device comprises a battery.

3. The computer-implemented method of claim 1, wherein the one or more distinct charging modes comprise an office charging mode and a home charging mode, and wherein the one or more distinct discharging modes comprise a self-discharging mode and a grid feed-in mode.

4. The computer-implemented method of claim 1, wherein the one or more pre-defined rules comprise one or more user-defined rules.

5. The computer-implemented method of claim 4, wherein the one or more user-defined rules comprise one or more user-defined rules for selecting one or more of the multiple virtual energy sub-units for a particular one of the distinct charging modes if multiple options are permissible per said mapping.

6. The computer-implemented method of claim 4, wherein the one or more user-defined rules comprise one or more user-defined rules for selecting one or more of the multiple virtual energy sub-units for a particular one of the distinct discharging modes if multiple options are permissible per said mapping.

7. The computer-implemented method of claim 1, wherein the one or more pre-defined rules comprise one or more rules pertaining to mapping feasibility.

8. The computer-implemented method of claim 1, wherein the one or more contextual details comprise one or more energy demand parameters associated with the portable energy storage device.

9. The computer-implemented method of claim 1, wherein the one or more contextual details comprise one or more energy supply parameters.

10. The computer-implemented method of claim 1, wherein the one or more contextual details comprise one or more cost parameters.

11. The computer-implemented method of claim 1, comprising:
    tracking energy flow into and out of each of the virtual energy storage sub-units.

12. The computer-implemented method of claim 1, comprising:
    generating a user interface.

13. The computer-implemented method of claim 12, wherein the user interface enables user access to a current state of one or more of the multiple virtual energy sub-units.

14. The computer-implemented method of claim 12, wherein the user interface enables user-reconfiguration of said mapping.

15. The computer-implemented method of claim 12, wherein the user interface enables user-definition of one or more user preferences.

16. A computer program product comprising a computer readable storage medium having program instructions embodied therewith, the program instructions executable by a device to cause the device to:
    divide a portable energy storage device into multiple virtual energy storage sub-units;
    restrict each of one or more energy charging options to one or more distinct charging modes;
    restrict each of one or more energy discharging options to one or more distinct discharging modes;
    map, in accordance with one or more pre-defined rules, each respective one of the multiple virtual energy sub-units to at least one of (i) one or more of the distinct charging modes and (ii) one or more of the distinct discharging modes; and
    automatically charge and automatically discharge the portable energy storage device based on (i) said mapping and (ii) one or more contextual details.

17. A system comprising:
    a memory; and
    at least one processor operably coupled to the memory and configured for:
        dividing a portable energy storage device into multiple virtual energy storage sub-units;
        restricting each of one or more energy charging options to one or more distinct charging modes;
        restricting each of one or more energy discharging options to one or more distinct discharging modes;
        mapping, in accordance with one or more pre-defined rules, each respective one of the multiple virtual energy sub-units to at least one of (i) one or more of the distinct charging modes and (ii) one or more of the distinct discharging modes; and
        automatically charging and automatically discharging the portable energy storage device based on (i) said mapping and (ii) one or more contextual details.

18. A computer-implemented method, the method comprising steps of:
    compartmentalizing energy stored in a portable energy storage device into multiple virtual energy storage sub-units, wherein the portable energy storage device is associated with a user;
    mapping, based on one or more preferences defined by the user, each respective one of the multiple virtual energy sub-units to at least one of (i) one or more distinct charging modes and (ii) one or more distinct discharging modes;
    charging and discharging the portable energy storage device based on (i) said mapping and (ii) one or more contextual details; and
    precluding charging and discharging of the portable energy storage device under conditions that are in conflict with (i) said mapping and (ii) said one or more contextual details;
    wherein the steps are carried out by at least one computing device.

19. The computer-implemented method of claim 18, wherein the portable energy storage device comprises a battery, wherein the one or more distinct charging modes comprise an office charging mode and a home charging mode, and wherein the one or more distinct discharging modes comprise a self-discharging mode and a grid feed-in mode.

20. The computer-implemented method of claim 18, comprising:
    generating a user interface, wherein the user interface enables the user to:
        monitor a current state of storage capacity in the virtual energy storage sub-units;
        re-define one or more of the preferences; and
        reconfigure one or more mappings between the multiple virtual energy sub-units, the one or more of the distinct charging modes, and the one or more of the distinct discharging modes.

* * * * *